US009949268B2

(12) United States Patent
Kuroki (10) Patent No.: US 9,949,268 B2
(45) Date of Patent: Apr. 17, 2018

(54) PORTABLE COMMUNICATION DEVICE AND COMMUNICATION CONTROL METHOD

(71) Applicant: KYOCERA Corporation, Kyoto-shi, Kyoto (JP)

(72) Inventor: Kaoru Kuroki, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 106 days.

(21) Appl. No.: 14/687,759

(22) Filed: Apr. 15, 2015

(65) Prior Publication Data

US 2015/0223225 A1 Aug. 6, 2015

Related U.S. Application Data

(63) Continuation-in-part of application No. PCT/JP2013/077775, filed on Oct. 11, 2013.

(30) Foreign Application Priority Data

Oct. 15, 2012 (JP) ................. 2012-228371

(51) Int. Cl.
*H04W 72/04* (2009.01)
*H04M 1/725* (2006.01)
*H04W 88/04* (2009.01)

(52) U.S. Cl.
CPC ..... *H04W 72/048* (2013.01); *H04M 1/72569* (2013.01); *H04M 2250/06* (2013.01); *H04W 88/04* (2013.01)

(58) Field of Classification Search
CPC ...... H04W 48/18; H04W 88/06; H04B 1/406; H04B 1/005; H04B 1/006; H03G 3/3042

(Continued)

(56) References Cited

U.S. PATENT DOCUMENTS 8,255,720 B1 * 8/2012 Conway .............. G01C 21/265
455/573
2003/0083097 A1 * 5/2003 Kim .................... H04B 1/3805
455/553.1
(Continued)

FOREIGN PATENT DOCUMENTS

JP 2001-025066 A 1/2001
JP 2007-028176 A 2/2007
(Continued)

OTHER PUBLICATIONS

International Search Report dated Dec. 24, 2013 issued in counterpart International application No. PCT/JP2013/077775.
(Continued)

*Primary Examiner* — Omoniyi Obayanju
(74) *Attorney, Agent, or Firm* — Procopio Cory Hargreaves and Savitch LLP (57) ABSTRACT

According to an embodiment of the disclosure, a portable communication device includes a first communication module, a second communication module, and a control module. The first communication module can communicate with a first network wirelessly via a first protocol. The second communication module can communicate wirelessly via a second protocol. The control module can control the first communication module and the second communication module. When the portable communication device starts recharging while communication by the second communication module is disable, the control module can permit the second communication module to connect with at least one external device in a first mode. During the second communication module sets in the first mode, the external devices can communicate wirelessly via the second communication module and the first communication module.

10 Claims, 10 Drawing Sheets

(58) Field of Classification Search
USPC ....... 455/552.1, 571–574; 370/318, 338, 334
See application file for complete search history.

(56) References Cited

U.S. PATENT DOCUMENTS

| | | | |
|---|---|---|---|
| 2004/0063456 A1* | 4/2004 | Griffin | H04B 1/3877 455/550.1 |
| 2005/0156712 A1* | 7/2005 | Jyrinki | H04W 76/02 340/286.01 |
| 2006/0067299 A1 | 3/2006 | Caspi et al. | |
| 2007/0015459 A1 | 1/2007 | Okazaki | |
| 2009/0257379 A1 | 10/2009 | Robinson et al. | |
| 2010/0034083 A1 | 2/2010 | Prakesh et al. | |
| 2010/0248613 A1* | 9/2010 | Miyoshi | H04W 88/04 455/7 |
| 2012/0115549 A1* | 5/2012 | Kim | H02J 7/0047 455/566 |
| 2012/0149312 A1 | 6/2012 | Velusamy et al. | |
| 2013/0005350 A1* | 1/2013 | Campos | H04W 48/18 455/456.1 |
| 2013/0090115 A1* | 4/2013 | Deivasigamani | H04W 48/20 455/434 |
| 2014/0057643 A1 | 2/2014 | Nawashiro | |

FOREIGN PATENT DOCUMENTS

| | | |
|---|---|---|
| JP | 2010-41147 A | 2/2010 |
| JP | 2011-530898 A | 12/2011 |
| WO | 2012/137908 A1 | 10/2012 |

OTHER PUBLICATIONS

Office Action dated Oct. 25, 2016 issued bye the Japanese Patent Office corresponding Japanese Patent Application No. 2012-228371.

Han, Hao et al DozyAP: Power-Efficient Wi-Fi Tethering, MobiSys '12, Jun. 25-29, 2012. Low Wood Bay, Lake District, UK.

Supplementary European Search Report dated Aug. 25, 2016 issued by the European Patent Office for Counterpart European Application No. 13847029.

* cited by examiner

PORTABLE COMMUNICATION DEVICE AND COMMUNICATION CONTROL METHOD

CROSS-REFERENCE

The present application is a continuation-in-part application of PCT Application No. PCT/JP2013/077775 filed on Oct. 11, 2013, which claims the benefit of Japanese Application No. 2012-228371, filed on Oct. 15, 2012. PCT Application No. PCT/JP2013/077775 is entitled "PORTABLE COMMUNICATION DEVICE AND COMMUNICATION CONTROL METHOD", and Japanese Application No. 2012-228371 is entitled "PORTABLE COMMUNICATION DEVICE AND COMMUNICATION CONTROL METHOD". The content of the above applications are incorporated by reference herein in their entirety.

TECHNICAL FIELD

The present application relates to a portable communication device having a plurality of communication modules, and a communication control method for the same.

BACKGROUND

A portable communication device supports a plurality of wireless communication protocols, and is capable of accessing each network.

A relay function, also known as tethering, is provided (for example, refer to Patent Document 1), in which an external device is connected by one wireless communication protocol (for example, Wi-Fi), and this external device is connected to a predetermined network (for example, the Internet) by another wireless communication protocol (for example, CDMA, LTE, etc.).

Patent Document 1: Japanese Unexamined Patent Application (Translation of PCT Application), Publication No. 2011-530898

SUMMARY

According to an embodiment of the disclosure, a portable communication device includes a first communication module, a second communication module, and a control module. The first communication module can communicate with a first network wirelessly via a first protocol. The second communication module can communicate wirelessly via a second protocol. The control module can control the first communication module and the second communication module. When the portable communication device starts recharging while communication by the second communication module is disable, the control module can permit the second communication module to connect with at least one external device in a first mode. During the second communication module sets in the first mode, the external devices can communicate wirelessly via the second communication module and the first communication module.

DETAILED DESCRIPTION

An embodiment of the present application is described in detail with reference to the drawings. Hereinafter, a smartphone will be described as an example of a portable communication device.

Figure 1:
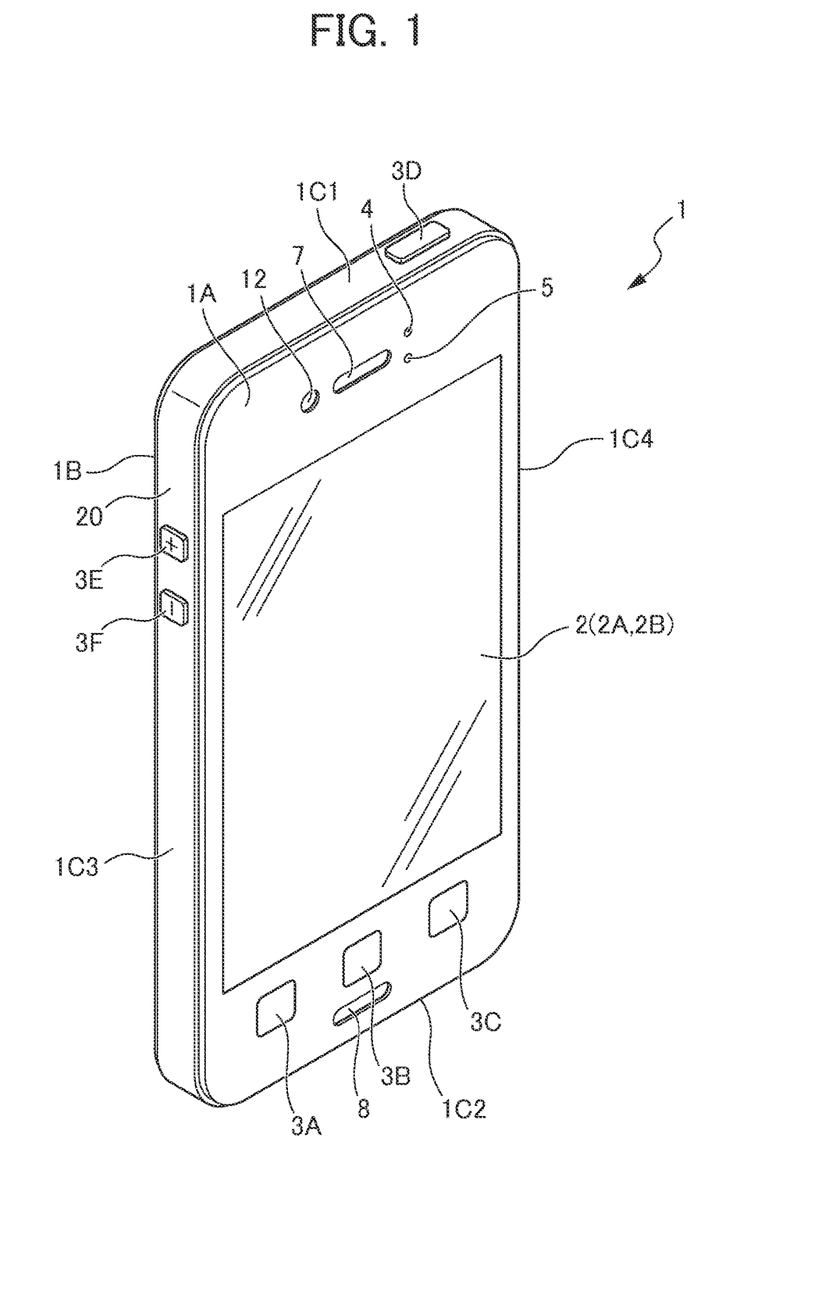
FIG. 1 is a perspective view showing an external appearance of a smartphone according to an embodiment.
Figure 2:
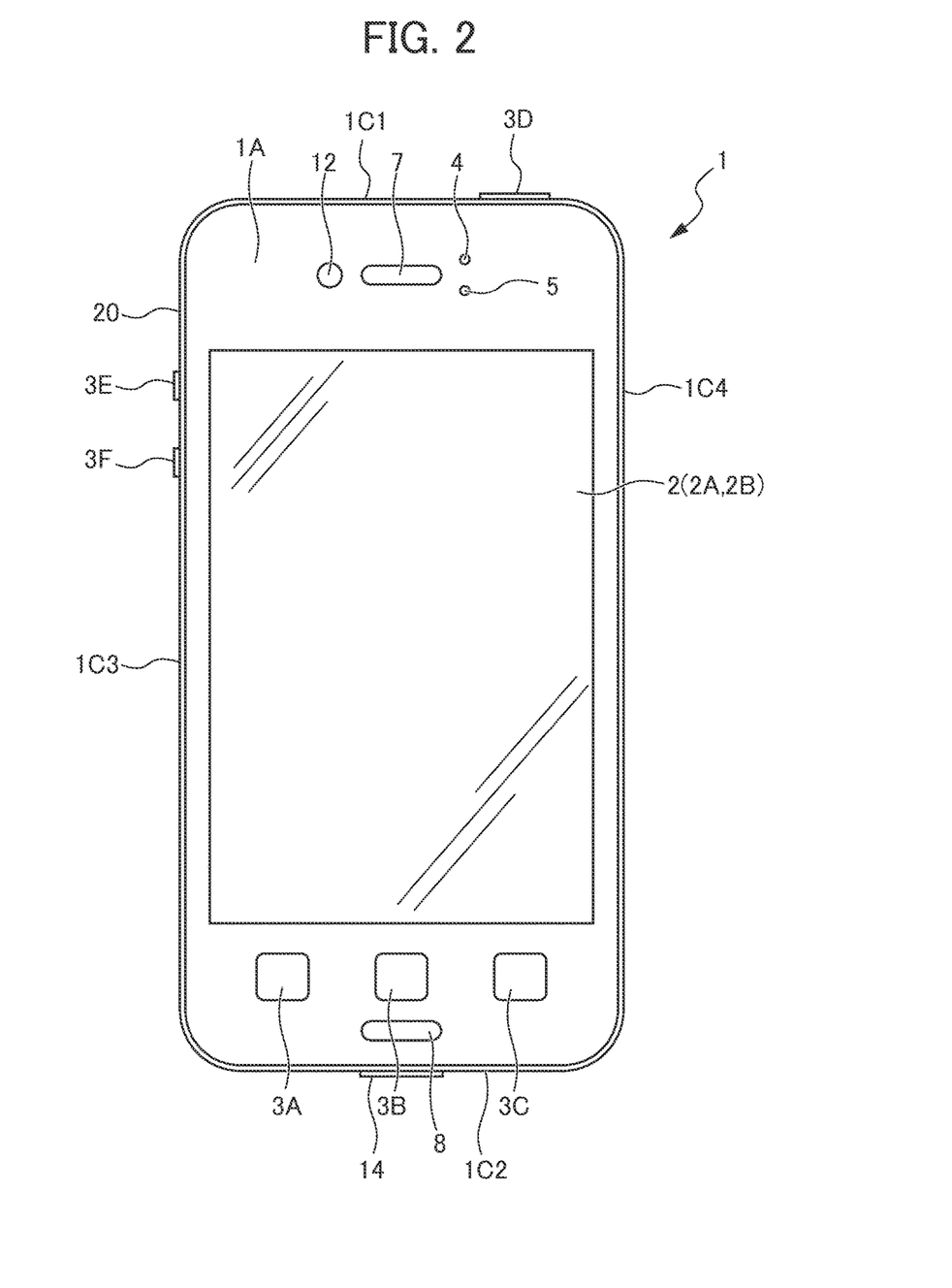
FIG. 2 is a front view showing an external appearance of a smartphone according to an embodiment.
Figure 3:
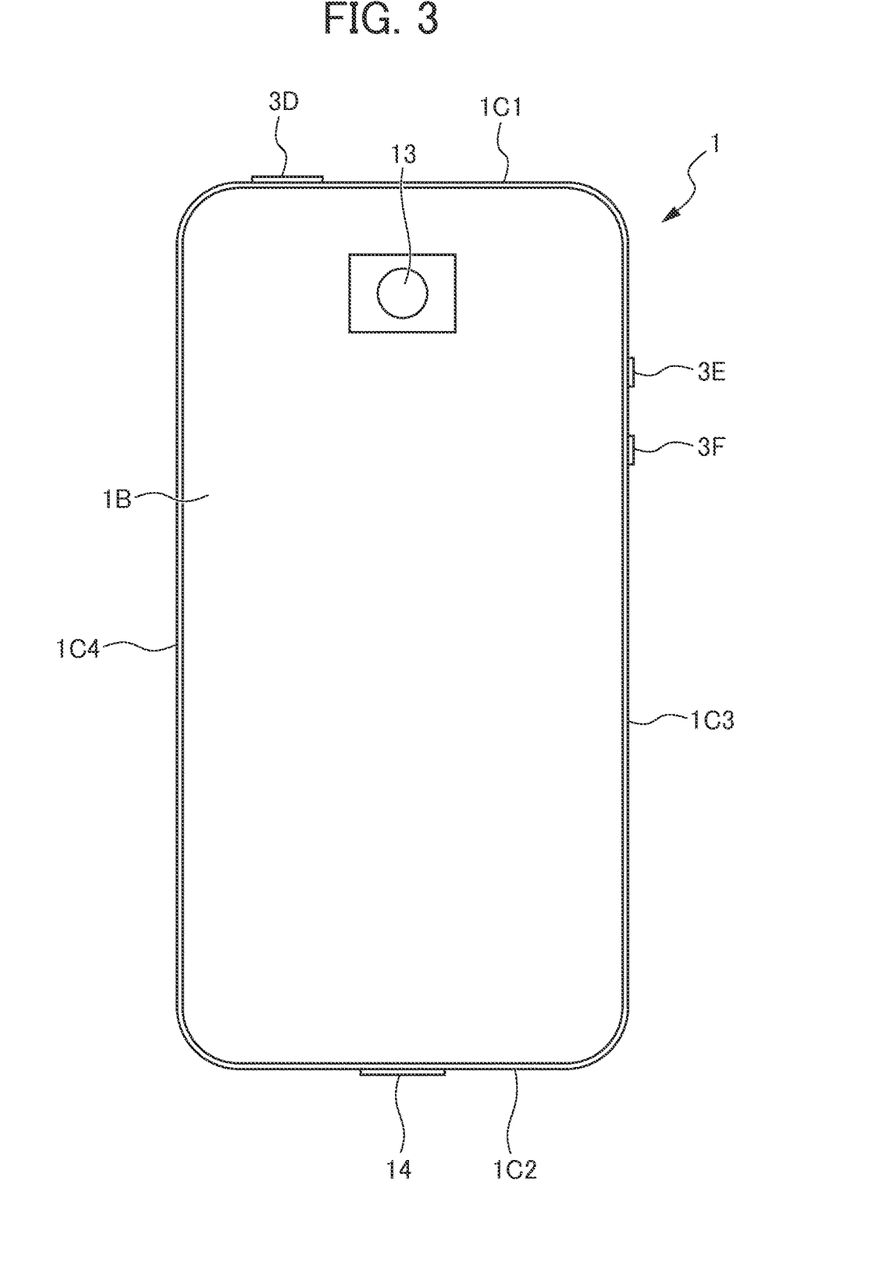
FIG. 3 is rear view showing an external appearance of a smartphone according to an embodiment.

Descriptions are provided for an external appearance of a smartphone 1 according to an embodiment with reference to FIGS. 1 to 3. As shown in FIGS. 1 to 3, the smartphone 1 may include a housing 20. The housing 20 has a front face 1A, a back face 1B, and side faces 1C1 to 1C4. The front face 1A is a front face of the housing 20. The back face 1B is a back face of the housing 20. The side faces 1 C1 to 1C4 are side faces. The side faces 1C1 to 1C4 connect the front face 1A and the back face 1B. In the following descriptions, the side faces 1C1 to 1C4 may be collectively referred to as a side face 1C without specifying which face.

In the front face 1A, the smartphone 1 has a touch-screen display 2, buttons 3A to 3C, an illuminance sensor 4, a proximity sensor 5, a receiver 7, a microphone 8, and a camera 12. The smartphone 1 has a camera 13 in the back face 1B. The smartphone 1 has buttons 3D to 3F and an external interface 14 in the side face 1C. In the following descriptions, the buttons 3A to 3F may be collectively referred to as a button 3 without specifying which button.

The touch-screen display 2 may include a display 2A and a touch screen 2B. The display 2A may include a display device such as a liquid crystal display, an organic electro-luminescence panel, or an inorganic electro-luminescence panel. The display 2A can display characters, images, symbols, graphics or the like.

The touch screen 2B can detect a touch by a finger, a stylus pen or the like to the touch-screen display 2. The touch screen 2B can detect a position where a plurality of fingers, the stylus pen or the like touch the touch-screen display 2.

A detection method for the touch screen 2B may be any method such as a capacitive sensing method, a resistor film method, a surface acoustic wave method (or an ultrasonic sensing method), an infrared ray method, an electromagnetic induction method, and a load detection method. In the following, for the purpose of simplifying descriptions, the fingers, the stylus pen or the like, touching of which to the touch-screen display 2 is detected by the touch screen 2B, may be simply referred to as a "finger".

The smartphone 1 can distinguish types of gestures, based on a touch, a touch position(s), a touching period of time, or the number of times touching is done, as detected by the touch screen 2B. The gesture is an operation that is performed on the touch-screen display 2. The gestures that are distinguished by the smartphone 1 include a touch, a long touch, a release, a swipe, a tap, a double tap, a long tap, a drag, a flick, a pinch-in, a pinch-out, and the like.

The touch is a gesture of a finger that touches the touch-screen display 2 (for example, a surface thereof). The smartphone 1 distinguishes the gesture of a finger touching the touch-screen display 2 as a touch. The long touch is a gesture of a finger touching the touch-screen display 2 for more than a certain period of time. The smartphone 1 distinguishes the gesture of a finger touching the touch-screen display 2 for more than a certain period of time as a long touch.

The release is a gesture of a finger being released from the touch-screen display 2. The smartphone 1 distinguishes the gesture of a finger being released from the touch-screen display 2 as a release. The swipe is a gesture of a finger moving while touching the touch-screen display 2. The smartphone 1 distinguishes the gesture of a finger moving while touching the touch-screen display 2 as a swipe.

The tap is a consecutive gesture of touch and release. The smartphone 1 distinguishes the consecutive gesture of touch and release as a tap. The double tap is a gesture of repeating a consecutive gesture of touch and release two times. The smartphone 1 distinguishes the gesture of repeating a consecutive gesture of touch and release two times as a double tap.

The long tap is a consecutive gesture of a long touch and release. The smartphone 1 distinguishes the consecutive gesture of a long touch and release as a long tap. The drag is a gesture of swiping from a starting point where a movable object is displayed. The smartphone 1 distinguishes the gesture of swiping from a starting point where a movable object is displayed as a drag.

The flick is a consecutive gesture of touch and release of a finger moving at a high-speed in one direction. The smartphone 1 distinguishes the gesture of touch and release of a finger moving at a high-speed in one direction as a flick. The flick includes: an upward flick of a finger moving in an upward direction on the screen; a downward flick of a finger moving in a downward direction on the screen; a rightward flick of a finger moving in a rightward direction on the screen; a leftward flick of a finger moving in a leftward direction on the screen; and the like.

The pinch-in is a gesture of a plurality of fingers swiping in mutually approaching directions. The smartphone 1 distinguishes the gesture of a plurality of fingers swiping in mutually approaching directions as a pinch-in. The pinch-out is a gesture of a plurality of fingers swiping in mutually receding directions. The smartphone 1 distinguishes the gesture of a plurality of fingers swiping in mutually receding directions as a pinch-out.

The smartphone 1 is operated in accordance with these gestures that are distinguished via the touch screen 2B. Therefore, intuitive and easy-to-use operability is achieved for a user. An operation, which is performed by the smartphone 1 in accordance with a gesture thus distinguished, is different depending on the screen that is displayed on the touch-screen display 2.

Figure 4:
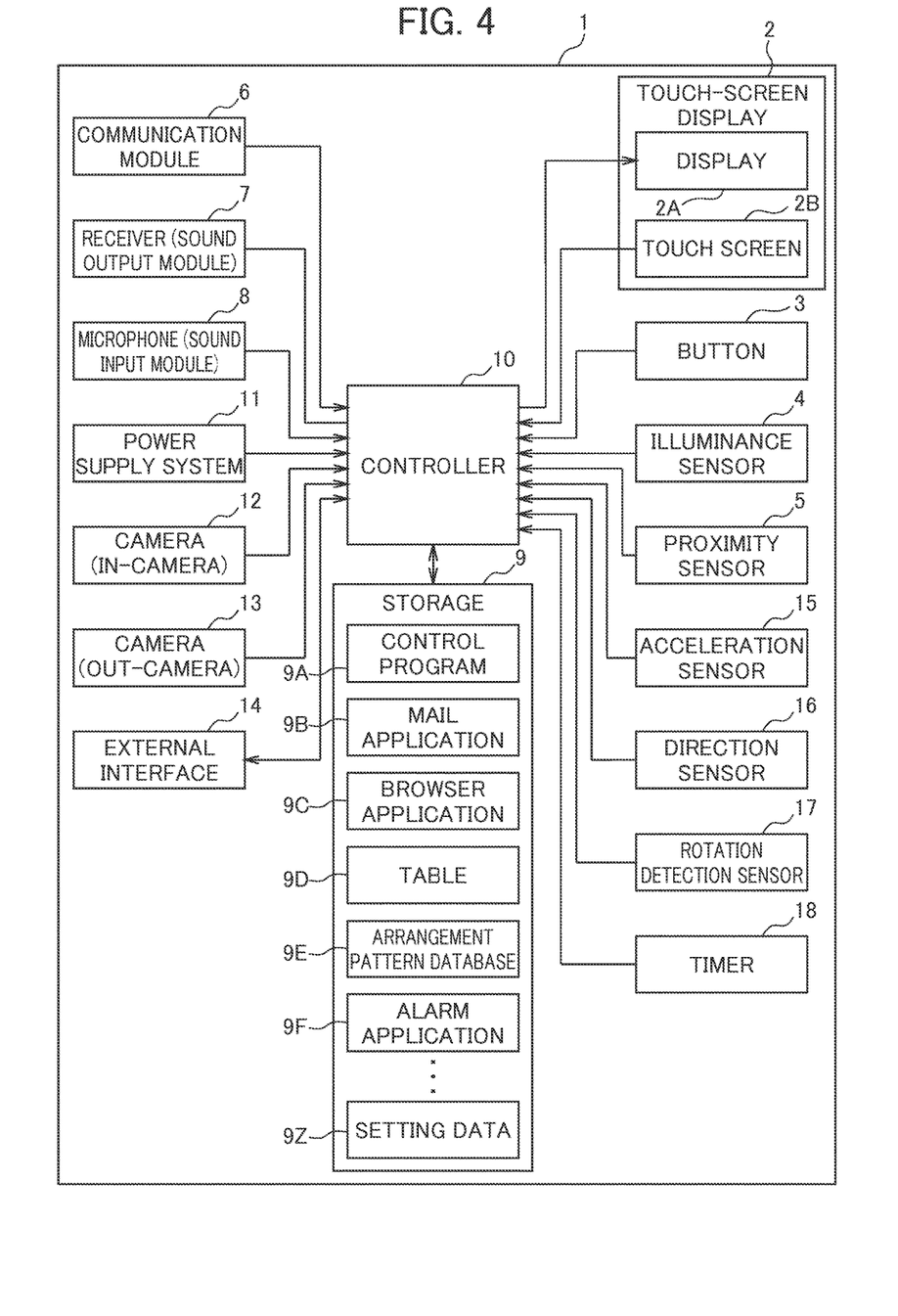
FIG. 4 is a block diagram showing an arrangement of a smartphone according to an embodiment.

FIG. 4 is a block diagram showing an arrangement of the smartphone 1. The smartphone 1 may include the touch-screen display 2, the button 3, the illuminance sensor 4, the proximity sensor 5, a communication module 6, the receiver 7, the microphone 8, a storage 9, a controller 10, cameras 12 and 13, an external interface 14, an acceleration sensor 15, a direction sensor 16, and a rotation detection sensor 17.

As described above, the touch-screen display 2 may include the display 2A and the touch screen 2B. The display 2A can display characters, images, symbols, graphics or the like. The touch screen 2B can detect a gesture.

The button 3 is operated by the user. The button 3 may include the buttons 3A to 3F. The controller 10 can collaborate with the button 3 to detect an operation of the button. The operation of the button may include, for example, a click, a double click, a push, and a multi-push.

For example, the buttons 3A to 3C may be a home button, a back button or a menu button. For example, the button 3D may be a power on/off button of the smartphone 1. The button 3D may also serve as a sleep/wake-up button. For example, the buttons 3E and 3F may be volume buttons.

The illuminance sensor 4 can detect illuminance. For example, the illuminance may include intensity, brightness, brilliance, etc. of light. For example, the illuminance sensor 4 may be used for adjusting the brilliance of the display 2A.

The proximity sensor 5 can detect presence of a proximate object in a contactless manner. The proximity sensor 5 may detect, for example, a face being brought close to the touch-screen display 2.

The communication module 6 can communicate wirelessly. Communication schemes implemented by the communication module 6 may include wireless communication standards. For example, the wireless communication standards may include cellular phone communication standards such as 2G, 3G and 4G. For example, the cellular phone communication standards may include LTE (Long Term Evolution), W-CDMA (Wideband Code Division Multiple Access), CDMA2000 (Code Division Multiple Access 2000), PDC (Personal Digital Cellular), GSM (Global System for Mobile Communications), PHS (Personal Handyphone System), etc. For example, the wireless communication standards may include WiMAX (Worldwide Interoperability for Microwave Access), IEEE 802.11, Bluetooth, IrDA, NFC (Near Field Communication), etc. The communication module 6 may support one or more of the communication standards described above.

When the controller 10 transmits a sound signal to the receiver 7, the receiver 7 can output the sound signal as sound. The microphone 8 can convert sound such as the user's voice into a sound signal. The microphone 8 can transmit the sound signal to the controller 10. The smartphone 1 may further include a speaker(s) in addition to the receiver 7.

The storage 9 can store programs and data. The storage 9 may be also utilized as a working area for temporarily storing processing results of the controller 10. The storage 9 may include an arbitrary storage device such as a semiconductor storage device and a magnetic storage device. The storage 9 may include several types of storage devices. The storage 9 may include a combination of a portable storage medium such as a memory card with a reader for the storage medium.

The programs stored in the storage 9 may include: applications; and a control program. The applications may be executed in the foreground or the background. The control program may assist operations of the applications. For example, an application can cause the display 2A to display a predetermined screen. An application can cause the controller 10 to execute processing in accordance with a gesture detected by the touch screen 2B. The control program may be, for example, an OS. The applications and the control program may be installed in the storage 9 via wireless communication by the communication module 6 or via a storage medium.

The storage 9 may store, for example, a control program 9A, a mail application 9B, a browser application 9C, and setting data 9Z. The mail application 9B may provide electric mail functions of creating, transmitting, receiving and displaying electric mail. The browser application 9C may provide a web browsing function of displaying web pages. A table 9D may store various tables such as a key assignment table. An arrangement pattern database 9E may store patterns of arrangement such as arrangement of icons, which are displayed on the display 2A. The setting data 9Z may provide various set-up functions regarding operations of the smartphone 1.

The control program 9A may provide functions regarding a variety of control for operating the smartphone 1. For example, the control program 9A may implement a telephone call function by controlling the communication module 6, the receiver 7, the microphone 8, etc. The functions provided by the control program 9A may include functions of executing a variety of control such as changing the information displayed on the display 2A in accordance with a gesture detected via the touch screen 2B. The functions provided by the control program 9A may be utilized in combination with functions provided by other programs such as the mail application 9B.

The controller 10 may include, for example, a CPU (Central Processing Unit). The controller 10 may include an integrated circuit such as a SoC (System-on-a-chip) that integrates other constituent elements such as the communication module 6. The controller 10 can comprehensively control the operations of the smartphone 1 to implement various functions.

More specifically, the controller 10 may implement various functions by referring to data stored in the storage 9 as necessary, executing instructions included in a program stored in the storage 9, and controlling the display 2A, the communication module 6, etc. The controller 10 may change the control in accordance with a result of detection by various detecting modules such as the touch screen 2B, the button 3 and the acceleration sensor 15.

For example, the controller 10 can execute the control program 9A to execute a variety of control such as changing the information displayed on the display 2A in accordance with a gesture detected via the touch screen 2B.

The camera 12 may be an in-camera that photographs an object from a side of the front face 1A. The camera 13 may be an out-camera that photographs an object from a side of the back face 1B.

The external interface 14 may be a terminal. Another device can connect to the external interface 14. The external interface 14 may be a universal terminal such as USB (Universal Serial Bus), HDMI (High-Definition Multimedia Interface), Light Peak (may be Thunderbolt), and an earpiece-microphone connector. The external interface 14 may be a terminal designed for exclusive use, such as a Dock connector. A device that is connected to the external interface 14 includes, for example, an external storage, a speaker, and a communication device.

The acceleration sensor 15 can detect a direction and a level of acceleration when the acceleration acts on the smartphone 1. The direction sensor 16 can detect an orientation of geomagnetism. The rotation detection sensor 17 can detect rotation of the smartphone 1. Results of such detection by the acceleration sensor 15, the direction sensor 16 and the rotation detection sensor 17 may be utilized in combination to detect change in the position and posture of the smartphone 1.

Figure 5:
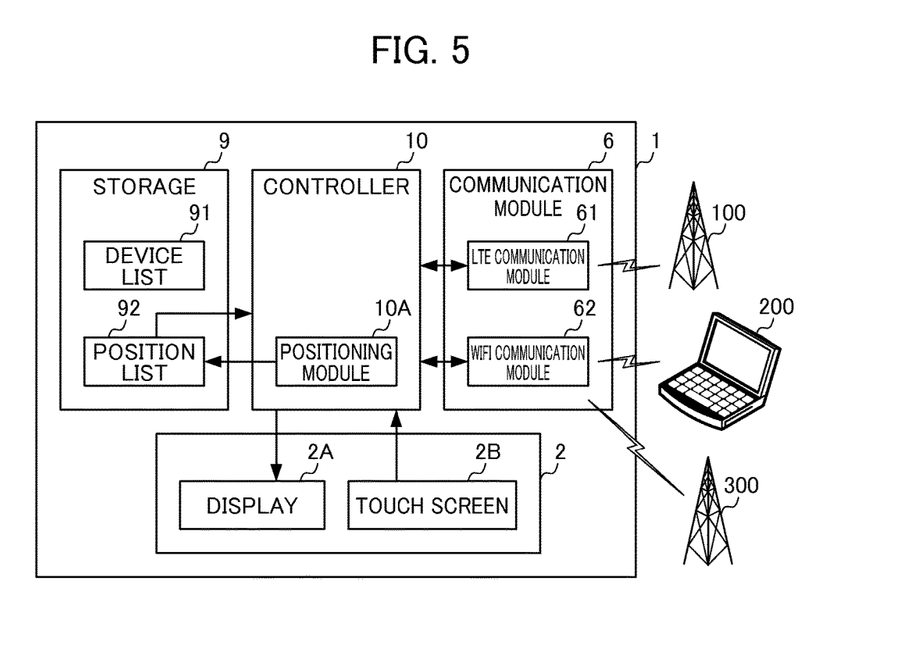
FIG. 5 is a block diagram showing detailed functions of a smartphone according to an embodiment.

FIG. 5 is a block diagram showing detailed functions of the communication module 6, the storage 9, and the controller 10 (as one example of a control module), in the smartphone 1.

In some embodiments, the smartphone 1 can support LTE as a first protocol, and Wi-Fi defined in IEEE 802.11 as a second protocol, for performing wireless data communication.

The communication module 6 may include a first communication module and a second communication module. The first communication module and the second communication module support different wireless communication protocols, respectively. The first communication module can connect to a first network. The second communication module can connect to a second network.

In an embodiment, the communication module 6 may include a LTE communication module 61 as the first communication module and a Wi-Fi communication module 62 as the second communication module. The LTE communication module 61 can communicate wirelessly with a LTE-enable base station using the LTE. The Wi-Fi communication module 62 can communicate wirelessly with the Wi-Fi-enable base station using the Wi-Fi.

The LTE communication module 61 can connect to an LTE network (which is an example of the first network) via a base station 100 (which is an example of the LTE-enable base station). In this way, the smartphone 1 performs data communication via the LTE network.

In a first mode, the Wi-Fi communication module 62 can connect to an external device 200 such as a communication device or a relay device, which can support Wi-Fi. The Wi-Fi communication module 62 can communicate with this communication device via Wi-Fi protocol. At this time, the controller 10 connects this external device 200 to the LTE network via the LTE communication module 61. Thus, this external device can perform data communication over the LTE network via the LTE communication module 61 and the Wi-Fi communication module 62. This first mode may be referred to as a tethering mode.

In a second mode, the Wi-Fi communication module 62 connects to a Wi-Fi network (which is an example of the second network) via an access point 300 (which is an example of the Wi-Fi-enable base station). In this way, the controller 10 performs data communication over the Wi-Fi network. The Wi-Fi network and the LTE network may be connected to each other via another network.

The storage 9 may include a device list 91 and a position list 92. The storage 9 may include a first storage module and a second storage module. The first storage module may storage the device list 91. The second storage module may storage the position list 92. The device list may include identifiable information of the external device 200. The identifiable information may include at least one identifiable device. The Wi-Fi communication module 62 was connected to the identifiable device in the past in the second mode. The position list 92 may include positional information of the smartphone 1. The positional information may include at least one historical position. The Wi-Fi communication module 62 was connected to the external device 200 in the second mode at one of the historical positions in the past. In the other word, when the Wi-Fi communication module 62 connects to the external device 200 in the second mode, the storage 9 may storage a geographical position as one of the historical positions.

The controller 10 can control the LTE communication module 61 and the Wi-Fi communication module 62. When the smartphone 1 starts the recharging while the communication by the Wi-Fi communication module 62 is disable, the controller 10 may permit the Wi-Fi communication module 62 to communicate in the first mode, under a predetermined condition.

At this time, when the Wi-Fi communication module 62 cannot search the access point 300, and cannot connect to the Wi-Fi network, the controller 10 can permit the Wi-Fi communication module 62 to communicate in the first mode. On the other hand, when the Wi-Fi communication module 62 has searched the access point 300, and can connect to the Wi-Fi network, the controller 10 does not permit the Wi-Fi communication module 62 to communicate in the first mode.

The controller 10 may include a positioning module 10A. The positioning module can obtain positional information of the smartphone 1. The positional information includes at least one position for pinpointing a geographical position of the smartphone 1. The positioning module 10A may obtain the geographical position through a signal from such as GPS (Global Positioning System) or information from a base station. When the Wi-Fi communication module 62 connects to the external device 200, the positioning module 10A may obtain the positional information of the smartphone 1. And the storage 9 may store this obtained positional information into the position list 92 as one of the historical positions.

When the recharging of the smartphone 1 is started, the controller 10 can cause the positioning module 10A to pinpoint the position. When the pinpointed positional information is close to at least one of the historical positions, the controller 10 can permit the Wi-Fi communication module 62 to set in the first mode. The case in which the positional information is close to each other refers to, for example, a case in which a predetermined condition is satisfied, such as a case in which the position is within a predetermined distance, or a case in which the position has been registered with the same base station; and such conditions can be set as appropriate.

When the recharging of the smartphone 1 is started, the controller 10 causes the Wi-Fi communication module 62 to search for the external device 200 whose identifiable information is stored in the device list 91. And if the Wi-Fi communication module 62 searches the identifiable device, the controller 10 may permit the Wi-Fi communication module 62 to perform communication in the first mode.

The Wi-Fi communication module 62 fails to connect with the external device 200 in a predetermined period of time after starting the recharging of the smartphone 1, the controller 10 may cause the Wi-Fi communication module 62 to suspend the searching.

Figure 6:
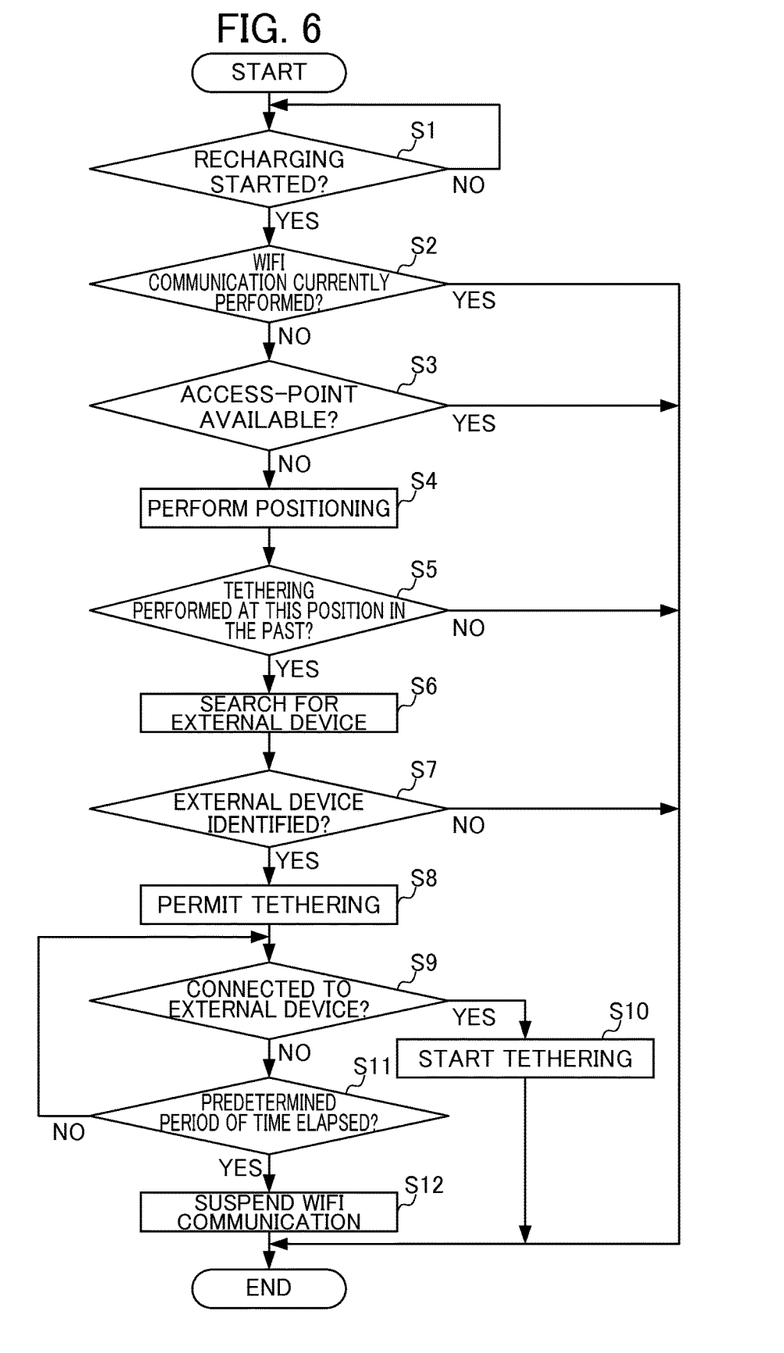
FIG. 6 is a flow chart showing processing according to an embodiment.

FIG. 6 is a flowchart showing processing by the controller 10 in the smartphone 1.

In Step S1, the controller 10 determines whether the recharging of the smartphone 1 is started. In a case in which the determination is YES, the processing advances to Step S2; and in a case in which the determination is NO, the processing maintains Step S1.

In Step S2, the controller 10 determines whether the Wi-Fi communication module 62 is performing communication. In a case in which the determination is YES, the controller 10 terminates the processing by maintaining the current mode (the first or second mode).

In Step S3, the controller 10 determines whether an access point 300 is available and is accessible by the Wi-Fi communication module 62. In a case in which the determination is YES, the processing is terminated; and in a case in which the determination is NO, the processing advances to Step S4.

In Step S4, the controller 10 causes the positioning module 10A to pinpoint the smartphone 1, and obtains positional information of the smartphone 1.

In Step S5, the controller 10 determines whether the positional information obtained in Step S4 is close to any of the positional information included in the position list 92. In a case in which the determination is YES, the controller 10 determines that the smartphone 1 is at a position where tethering was performed in the past; and the processing advances to Step S6. On the other hand, in a case in which the determination is NO, the controller 10 determines that the smartphone 1 is at a position where tethering was not performed in the past; and the processing is terminated.

In Step S6, the controller 10 searches for the external device 200, to which the Wi-Fi communication module 62 can connect.

In Step S7, the controller 10 determines whether the external device 200, whose identifiable information is included in the device list 91, is discovered. In a case in which the determination is YES, the processing advances to Step S8; and in a case in which the determination is NO, the processing is terminated.

In Step S8, the controller 10 permits the Wi-Fi communication module 62 to perform tethering communication in the first mode.

In Step S9, the controller 10 determines whether connection with the external device 200 is established. In a case in which the determination is YES, the processing advances to Step S10; and in a case in which the determination is NO, the processing advances to Step S11.

In Step S10, the controller 10 starts tethering by connecting the external device 200 to the LTE network via the Wi-Fi communication module 62 and the LTE communication module 61.

In Step S11, the controller 10 determines whether a predetermined period of time has elapsed without connecting to the external device 200. In a case in which the determination is YES, the processing advances to Step S12. On the other hand, in a case in which the determination is NO, the processing advances to Step S9, and the controller 10 stands by to be connected with the external device 200.

In Step S12, the controller 10 determines not to perform tethering, and causes the Wi-Fi communication module 62 to suspend the communication.

As described above, according to some embodiments, when the recharging of the smartphone 1 is started while the communication by the Wi-Fi communication module 62 is disable, the smartphone 1 automatically can permit tethering. Therefore, user operations may be simplified when relay is performed for connecting the external device 200 to the LTE network.

In a case in which connection with the external device 200 is not established in a predetermined period of time after starting the recharging of the smartphone 1, the smartphone 1 may cause the Wi-Fi communication module 62 to suspend the communication. Therefore, the processing load of user may be reduced when the tethering is not started.

When the recharging of the smartphone 1 is started, if a known external device 200 is discovered, with which tethering was performed in the past, the smartphone 1 may automatically permit tethering. Therefore, the tethering may be efficiently started when the external device 200 may be accessed.

The smartphone 1 can store positional information when connected to the external device 200 in the past. And when the positional information at the time of starting the recharging is close to the stored positional information, the smartphone 1 may automatically permit tethering. Therefore, the smartphone 1 can efficiently start tethering, by determining a situation where the smartphone 1 is likely to be connected to the external device 200.

In a case in which an access point is available, and the Wi-Fi communication module 62 can connect to the Wi-Fi network, the smartphone 1 does not permit tethering; and in a case in which an access point is not available, and the Wi-Fi communication module 62 cannot connect to the Wi-Fi network, the smartphone 1 automatically permits tethering. Therefore, the smartphone 1 can give priority to connection to the Wi-Fi network, and in a case in which the smartphone 1 cannot connect to the Wi-Fi network, the smartphone 1 can efficiently start tethering.

An embodiment of the present application is described in detail with reference to the drawings. Following embodiments differ from above embodiments, in conditions for the controller 10 to permit tethering in the first mode while recharging.

In following embodiments, features similar to above embodiments are assigned with identical reference numerals, descriptions of which are omitted or simplified herein.

Figure 7:
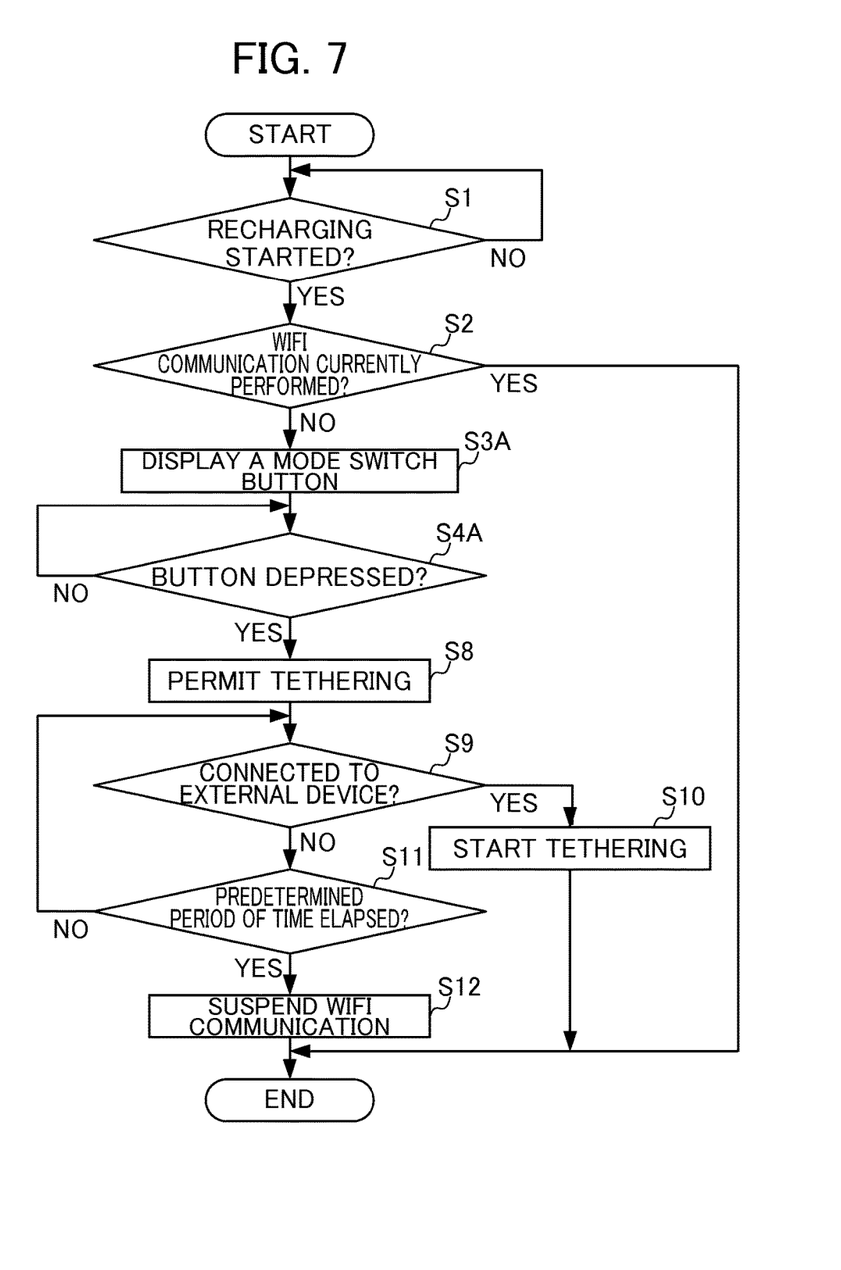
FIG. 7 is a flow chart showing processing according to an embodiment.

FIG. 7 is a flowchart showing processing by the controller 10 in the smartphone 1.

Steps S1, S2 and S8 to S12 are similar to those in above embodiments; and Steps S3A and S4A are different from above embodiments.

In Step S3A, the controller 10 performs display for receiving an instruction input for transitioning to the first mode. More specifically, the controller 10 causes the display 2A to display a mode switch button, and receives an instruction input from the touch screen 2B.

In Step S4A, the controller 10 determines whether the mode switch button displayed in Step S3A is depressed. In a case in which the determination is YES, the processing advances to Step S8 to permit tethering. On the other hand, in a case in which the determination is NO, the processing maintains Step S4A.

As described above, according to above embodiments, the smartphone 1 can provide a simple user interface, by displaying a mode switch button for starting tethering while recharging.

An embodiment of the present application is described in detail with reference to the drawings. Following embodiments differs from above embodiments, in conditions for the controller 10 to permit tethering in the first mode while recharging.

In following embodiments, features similar to those of above embodiments are assigned with identical reference numerals, descriptions of which are omitted or simplified herein.

Figure 8:
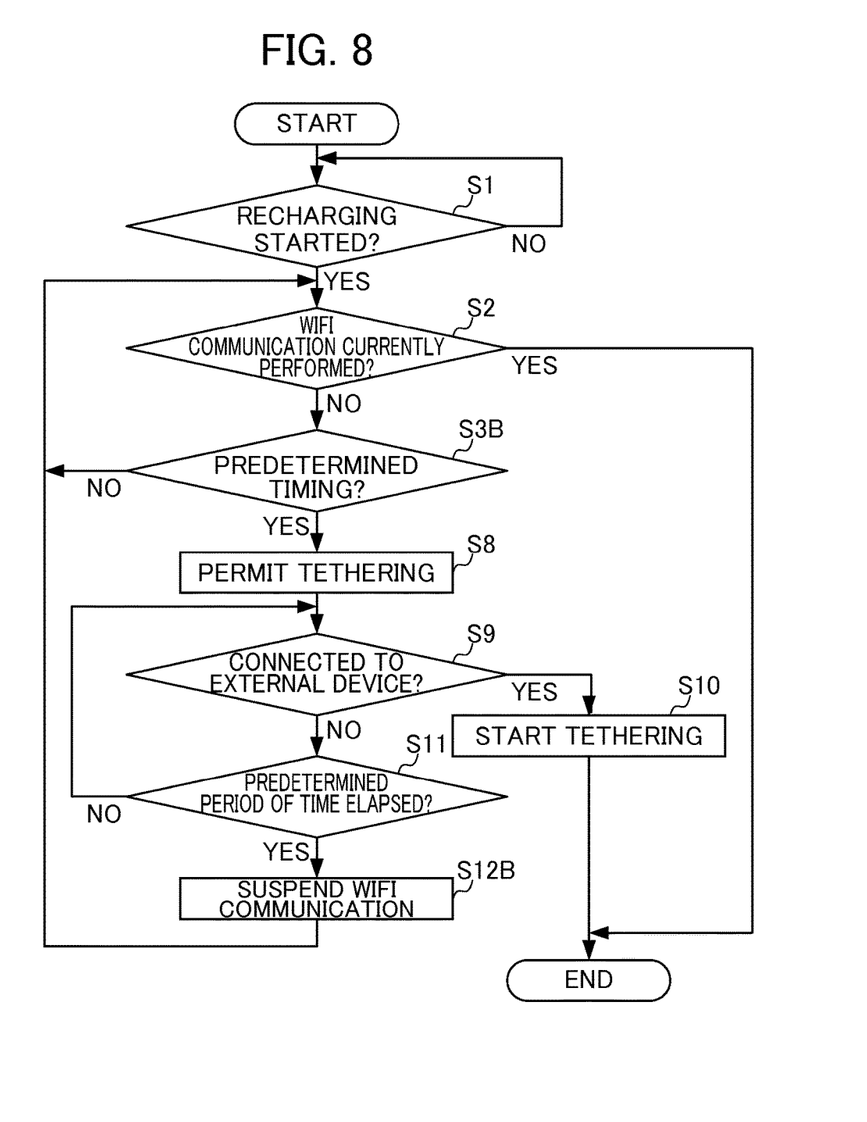
FIG. 8 is a flow chart showing processing according to an embodiment.

FIG. 8 is a flowchart showing processing by the controller 10 in the smartphone 1.

Steps S1, S2 and S8 to S11 are similar to those in above embodiments; and Steps S3B and S12B are different from above embodiments.

In Step S3B, the controller 10 determines whether now is the timing for attempting tethering in a predetermined cycle. In a case in which the determination is YES, the processing advances to Step S8 to permit tethering. On the other hand, in a case in which the determination is NO, the processing returns to Step S2.

In Step S12B, the controller 10 determines not to perform tethering, and causes the Wi-Fi communication module 62 to suspend the communication; and the processing returns to Step S2.

As described above, according to above embodiments, the controller 10 permits the Wi-Fi communication module 62 to perform communication in the first mode in a predetermined cycle while recharging. Therefore, the smartphone 1 can attempt tethering while recharging, while reducing the processing load.

An embodiment of the present application is described in detail with reference to the drawings. Following embodiments differs from above embodiments, in conditions for the controller 10 to permit tethering in the first mode while recharging.

In following embodiments, features similar to those of above embodiments are assigned with identical reference numerals, descriptions of which are omitted or simplified herein.

Figure 9:
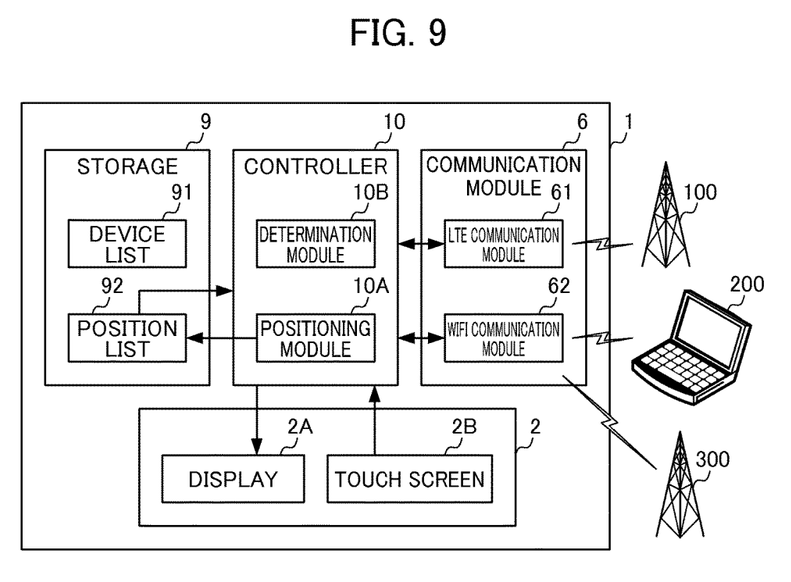
FIG. 9 is a block diagram showing detailed functions of a smartphone according to an embodiment.

FIG. 9 is a block diagram showing detailed functions of the communication module 6, the storage 9, and the controller 10, in the smartphone 1.

The controller 10 is provided with a determination module 10B for determining a recharging method for the smartphone 1.

The determination module 10B determines a recharging method, by determining, for example, whether the recharging is currently performed via a micro USB connector or a connection terminal for a dedicated battery charger, or is currently performed in a wireless manner. The determination module 10B may determine a posture of the body.

In accordance with the result of determination by the determination module 10B, the controller 10 changes whether to permit the Wi-Fi communication module 62 to perform communication in the first mode.

Figure 10:
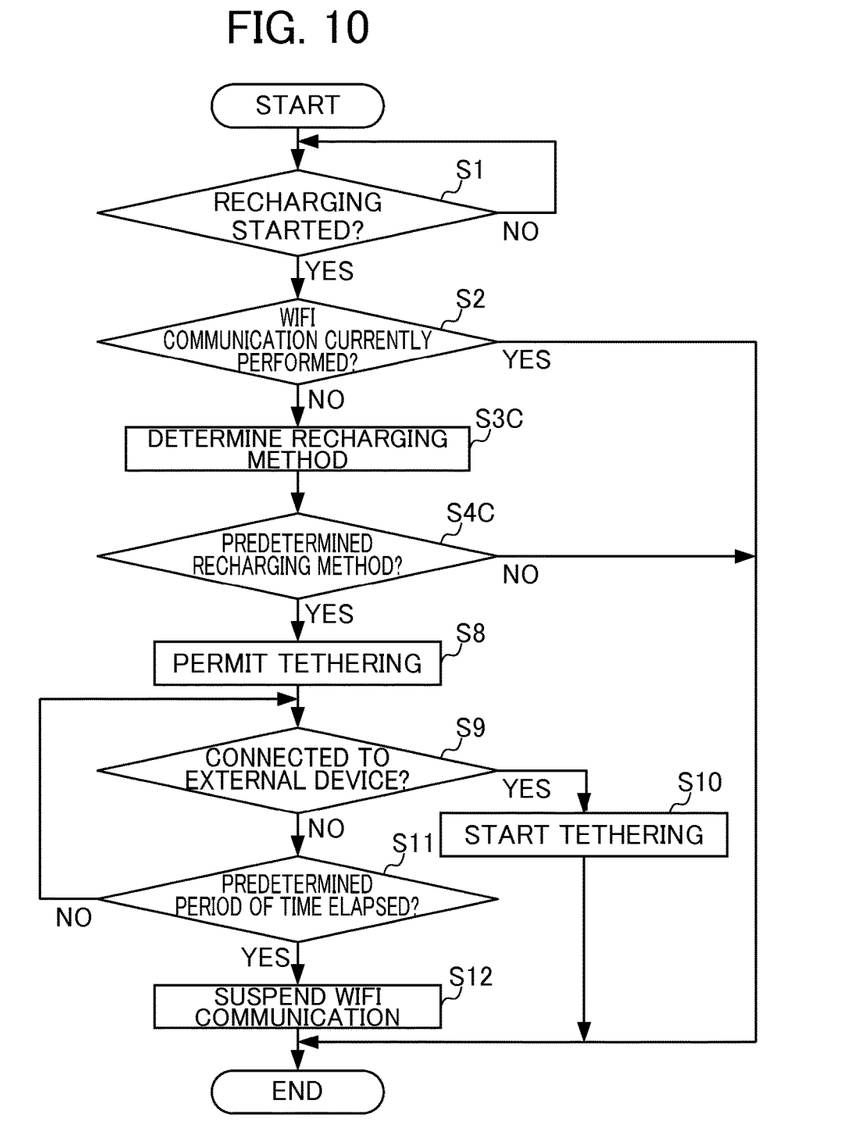
FIG. 10 is a flow chart showing processing according to an embodiment.

FIG. 10 is a flowchart showing processing by the controller 10 in the smartphone 1.

Steps S1, S2 and S8 to S12 are similar to those in above embodiments; and Steps S3C and S4C are different from above embodiments.

In Step S3C, the controller 10 causes the determination module 10B to determine a recharging method for the smartphone 1.

In Step S4C, the controller 10 determines whether the recharging method determined in Step S3C is a preset predetermined recharging method. In a case in which the determination is YES, the processing advances to Step S8 to permit tethering. On the other hand, in a case in which the determination is NO, the processing is terminated.

As described above, according to above embodiments, the smartphone 1 changes whether the tethering is performed in accordance with a recharging method; therefore, the user can easily change whether the tethering is performed, by selecting from a plurality of recharging methods.

Some embodiments of the present application have been described above; however, the present application is not limited to some embodiments described above. The effects described above in some embodiments of the present application are merely a list of the most preferable effects arising from the present application, and the effects arising from the present application are not limited to the effects described in some embodiments.

The condition for the controller 10 to permit tethering in the first mode while recharging may be an appropriate combination of the plurality of conditions described above in some embodiments.

The arrangement of the smartphone 1 shown in FIGS. 4 and 5 is merely an example, and may be modified as appropriate within a scope that does not depart from the spirit of the present application.

For example, the display module has been described as the display 2A, which is a part of the touch-screen display 2 having the function of detection via the touch screen 2B; however, the display module may be a display device without a detection function. In this case, an operation input module is separately provided for the user to select an item displayed on the display module.

The smartphone 1 has been described as supporting LTE and Wi-Fi, but is not limited thereto; and the smartphone 1 may support another protocol, and may support at least three protocols.

For example, a protocol such as a 3G protocol (CDMA 2000_1x EVDO, W-CDMA, etc.) or WiMAX defined in IEEE802.16e may be used as the first protocol. A protocol such as Bluetooth, IrDA, or USB may be used as the second protocol.

A part or all of the programs stored in the storage 9 as described in FIG. 4 may be downloaded from other devices via wireless communication by the communication module 6. A part or all of the programs stored in the storage 9 as described in FIG. 4 may be stored in a storage medium that is readable by a reader included in the storage 9. A part or all of the programs stored in the storage 9 as described in FIG. 4 may be stored in a storage medium such as a CD, a DVD or a Blu-ray that is readable by a reader connected to the external interface 14.

Each of the programs shown in FIG. 4 may be divided into a plurality of modules, and may be combined with other programs.

In some above embodiments, a smartphone has been described as an example of the portable communication device; however, the portable communication device is not limited to a smartphone. For example, the portable communication device may be a portable electronic device such as a mobile phone, a digital camera, a media player, a digital book reader, a navigator or a gaming machine, or may be a module dedicated for communication, which is specialized for a communication function.

EXPLANATION OF REFERENCE NUMERALS 1 smartphone (portable communication device)
2 touch screen display
2A display (as one example of a display module)
2B touch screen
6 communication module
9 storage
10 controller (as one example of a control module)
10A positioning module
10B determination module
61 LTE communication module (as one example of a first communication module)
62 Wi-Fi communication module (as one example of a second communication module)
91 device list
92 position list

The invention claimed is:

1. A portable communication device, comprising:
a first communication system configured to wirelessly communicate with a first network via a first communication protocol;
a second communication system configured to wirelessly communicate via a second communication protocol which is different than the first communication protocol; and
at least one processor configured to,
detect when the portable communication device starts recharging, and,
in response to detecting that the portable communication device has started recharging when communication by the second communication system is disabled,
enable the second communication system,
search for an access point using the second communication system,
when the access point is not found or the second communication system cannot connect to the access point, use the second communication system to connect with at least one external device in a first mode, in which the at least one external device is tethered to the portable communication device such that the at least one external device may use the portable communication device as a relay to wirelessly communicate with the first network by relaying data between the at least one external device and the second communication system, through the portable communication device, and between the first communication system and the first network, and,
when the access point is found and the second communication system can connect to the access point, use the second communication system to connect to the access point in a second mode, in which the second communication system wirelessly communicates with a second network via the access point.

2. The portable communication device according to claim 1, wherein the at least one processor is further configured to, if the second communication system fails to connect with the at least one external device within a predetermined period of time after detecting that the portable communication device has started recharging, cause the second communication system to suspend communication.

3. The portable communication device according to claim 1, further comprising a memory that stores an identifier of the at least one external device, wherein the at least one processor is further configured to, in response to detecting that the portable communication device has started recharging:
cause the second communication system to search for external devices; and
identify the at least one external device, from the external devices found in the search, based on the stored identifier of the at least one external device.

4. The portable communication device according to claim 1, wherein the at least one processor is configured to:
obtain positional information that identifies a position of the portable communication device; and,
in response to detecting that the portable communication device has started recharging, enable the second communication system to connect with the at least one external device in the first mode only when the obtained positional information matches historical positional information that identifies a position at which the portable communication device previously permitted tethering by the at least one external device.

5. The portable communication device according to claim 1, further comprising a display, wherein the at least one processor is configured to, in response to detecting that the portable communication device has started recharging:
via the display, prompt a user to input an instruction to transition to the first mode; and, enable the second communication system to connect with the at least one external device in the first mode only when the instruction is input by the user.

6. The portable communication device according to claim 2, wherein the at least one processor is configured to, in response to detecting that the portable communication device has started recharging, enable the second communication system to connect with the at least one external device in the first mode only according to a predetermined cycle.

7. The portable communication device according to claim 1, wherein the at least one processor is further configured to, in response to detecting that the portable communication device has started recharging, determine a recharging method, utilized by the recharging, from among a plurality of recharging methods, and enable the second communication system to connect with the at least one external device in the first mode only when the determined recharging method is a particular one of the plurality of recharging methods.

8. The portable communication device according to claim 1, wherein the second communication protocol conforms to IEEE 802.11.

9. The portable communication device according to claim 8, wherein the access point is a Wi-Fi-enabled base station.

10. A communication control method for a portable communication device including a first communication system for wirelessly communicating with a first network via a first communication protocol, and a second communication system for wirelessly communicating via a second communication protocol which is different than the first communication protocol, wherein the method comprises:
  detecting when the portable communication device starts recharging; and,
  in response to detecting that the portable communication device has started recharging,
    enabling the second communication system
    search for an access point using the second communication system,
    when the access point is not found or the second communication system cannot connect to the access point, use the second communication system to connect with at least one external device in a first mode, in which the at least one external device is tethered to the portable communication device such that the at least one external device may use the portable communication device to wirelessly communicate with the first network by relaying data between the at least one external device and the second communication system, through the portable communication device, and between the first communication system and the first network, and,
    when the access point is found and the second communication system can connect to the access point, use the second communication system to connect to the access point in a second mode, in which the second communication system wirelessly communicates with a second network via the access point.

* * * * *